(12) United States Patent
Sigal et al.

(10) Patent No.: US 9,477,908 B2
(45) Date of Patent: Oct. 25, 2016

(54) MULTI-LEVEL FRAMEWORK FOR OBJECT DETECTION

(71) Applicant: Disney Enterprises, Inc., Burbank, CA (US)

(72) Inventors: Leonid Sigal, Pittsburgh, PA (US); Michail Raptis, Washington, DC (US); Tian Lan, Burnaby (CA)

(73) Assignee: Disney Enterprises, Inc., Burbank, CA (US)

( * ) Notice: Subject to any disclaimer, the term of this patent is extended or adjusted under 35 U.S.C. 154(b) by 123 days.

(21) Appl. No.: 14/250,284

(22) Filed: Apr. 10, 2014

(65) Prior Publication Data

US 2015/0294192 A1 Oct. 15, 2015

(51) Int. Cl.
| | |
|---|---|
| G06F 3/048 | (2013.01) |
| G06K 9/62 | (2006.01) |
| G06F 17/30 | (2006.01) |
| G06N 99/00 | (2010.01) |
| G06N 7/00 | (2006.01) |

(52) U.S. Cl.
CPC ....... *G06K 9/6269* (2013.01); *G06F 17/30598* (2013.01); *G06K 9/627* (2013.01); *G06K 9/6218* (2013.01); *G06N 99/005* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 8,694,443 B2* | 4/2014 | Bobbitt | ............... | G06N 99/005 706/12 |
| 9,076,065 B1* | 7/2015 | Vijayanarasimhan | | G06K 9/6256 |
| 9,177,226 B2* | 11/2015 | Rabinovich | .......... | G06K 9/6218 |

(Continued)

OTHER PUBLICATIONS

L. Bourdev and J. Malik. Poselets: Body part detectors training using 3d human pose annotations. In ICCV, 2009.

(Continued)

*Primary Examiner* — Hien Duong
(74) *Attorney, Agent, or Firm* — Patterson + Sheridan, LLP

(57) ABSTRACT

The disclosure provides an approach for detecting objects in images. An object detection application receives a set of training images with object annotations. Given these training images, the object detection application generates semantic labeling for object detections, where the labeling includes lower-level subcategories and higher-level visual composites. In one embodiment, the object detection application identifies subcategories using an exemplar support vector machine (SVM) based clustering approach. Identified subcategories are used to initialize mixture components in mixture models which the object detection application trains in a latent SVM framework, thereby learning a number of subcategory classifiers that produce, for any given image, a set of candidate windows and associated subcategory labels. In addition, the object detection application learns a structured model for object detection that captures interactions among object subcategories and identifies discriminative visual composites, using subcategory labels and spatial relationships between subcategory labels to reason about object interactions.

20 Claims, 4 Drawing Sheets

(56) References Cited

U.S. PATENT DOCUMENTS

| | | | | |
|---|---|---|---|---|
| 2009/0123021 | A1* | 5/2009 | Jung | G11B 27/28 382/100 |
| 2010/0179950 | A1* | 7/2010 | Willcock | G06Q 10/00 707/723 |
| 2010/0189354 | A1* | 7/2010 | de Campos | G06K 9/00597 382/190 |
| 2010/0220922 | A1* | 9/2010 | Okada | G06K 9/6282 382/159 |
| 2012/0045095 | A1* | 2/2012 | Tate | G06T 5/003 382/103 |
| 2014/0198980 | A1* | 7/2014 | Fukui | G06K 9/00677 382/159 |
| 2014/0201126 | A1* | 7/2014 | Zadeh | G06K 9/627 706/52 |
| 2014/0247978 | A1* | 9/2014 | Devin | G06K 9/6262 382/159 |
| 2014/0270495 | A1* | 9/2014 | Tu | G06K 9/6259 382/160 |
| 2015/0169998 | A1* | 6/2015 | Rabinovich | G06K 9/6218 382/159 |
| 2015/0294192 | A1* | 10/2015 | Lan | G06K 9/6269 382/159 |

OTHER PUBLICATIONS

M. J. Choi, J. J. Lim, A. Torralba, and A. S. Willsky. Exploiting hierarchical context on a large database of object categories. In CVPR, 2010.

C. Desai and D. Ramanan. Recognizing actions, poses, and objects with relational phraselets. In ECCV, 2012.

C. Desai, D. Ramanan, and C. Fowlkes. Discriminative models for multi-class object layout. In ICCV, 2009.

T.-M.-T. Do and T. Artieres. Large margin training for hidden markov models with partially observed states. In ICML, 2009.

P. F. Felzenszwalb, R. B. Girshick, D. McAllester, and D. Ramanan.; Object detection with discriminatively trained part based models. IEEE PAMI, 32(9), 2010.

B. J. Frey and D. Dueck. Clustering by passing messages between data points. Science, 2007.

C. Galleguillos, B. McFee, S. Belongie, and G. Lanckriet. Multiclass object localization by combining local contextual interactions. In CVPR, 2010.

C. Gu, P. Arbelaez, Y. Lin, K. Yu, and J. Malik. Multi-component models for object detection. In ECCV, 2012.

C. Gu and X. Ren. Discriminative mixture-of-templates for viewpoint classification. In ECCV, 2010.

D. Hoiem, A. A. Efros, and M. Hebert. Putting objects in perspective. In CVPR, 2006.

C. Li, D. Parikh, and T. Chen. Automatic discovery of groups of objects for scene understanding. In CVPR, 2012.

T. Malisiewicz, A. Gupta, and A. A. Efros. Ensemble of exemplar—SVMs for object detection and beyond. In ICCV, 2011.

M. A. Sadeghi and A. Farhadi. Recognition using visual phrases. In CVPR, 2011.

S. K. Diwala, A. A. Efros. How important are 'deformable parts' in the deformable parts model? In Parts and Attributes Workshop, ECCV, 2012.

S. K. Diwala, A. A. Efros. Object instance sharing by enhanced; bounding box correspondence. In BMVC, 2012.

S. Singh, A. Gupta, and A. A. Efros. Unsupervised discovery of mid-level discriminative patches. In ECCV, 2012.

B. Yao and L. Fei-Fei. Modeling mutual context of object and human pose in human-object interaction activities. In CVPR, 2010.

P.F. Felzenszwalb, R. B. Girshick, and D. McAllester. Discriminatively trained deformable part models, release 4. http://people.cs.uchicago.edu/pff/latent-release4.

* cited by examiner

MULTI-LEVEL FRAMEWORK FOR OBJECT DETECTION

BACKGROUND

1. Field

Embodiments presented herein provide techniques for detecting objects in images and, more specifically, techniques which utilize a multi-level framework for detection and localization of objects in images.

2. Description of the Related Art

The appearance of an object in an image can change profoundly with pose, camera view, and interactions of the object with other objects. For example, the appearance of a person can change depending on the pose of the person; the camera view; and if the person is walking, riding a bike, etc. To deal with such variations, some traditional object detectors model multiple subcategories (e.g., multiple views, poses, etc. of a "person") for each object category. However, these object detectors typically require the number of subcategories to be manually pre-defined. As a result, the number of subcategories may not adequately reflect the actual appearance variation of the object. In addition, some object detectors model interactions between objects, but typically ignore subtle joint appearance changes between objects caused by their interaction. For example, in an image of a person riding a bicycle, the appearance of both the bicycle and the person exhibit view-consistent appearance change, including the rider's legs occluding specific parts of the bicycle and the bicycle creating a highly textured background close to the rider's legs. This joint appearance change of the person and the bicycle, resulting from their interaction, is ignored by traditional object-detection models.

SUMMARY

One aspect of the invention provides a computer implemented method for detecting objects in an input image. The method generally includes receiving a set of training images and associated annotations, the annotations labeling categories and locations of objects which appear in the images. The method further includes determining one or more subcategories for each of the categories of objects, where the number of subcategories is inferred from the training images and the associated annotations. The method also includes training classifiers for detecting the subcategories. The detection is enhanced by training a structured model for each object category, where the structured model accounts for relationships between detected subcategories. In addition, the method includes detecting the objects in the input image using the trained subcategory classifiers and structured models.

Other aspects include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Embodiments disclosed herein provide techniques for detecting objects in images, with the goal being to train models capable of detecting specific objects (e.g., persons, bicycles, or any other coherent structure) in input images. In one embodiment, an object detection application receives a set of training images with object annotations indicating bounding boxes for objects that appear in the images and labels of the categories to which those objects belong (e.g., "person," "bicycle," etc.). Given these training images and object annotations, the object detection application automatically discovers subcategories of objects via a clustering technique. As used herein, "subcategories" refer to visual clusters that capture appearance variations of an object in multiple images. For example, a "person" object may include subcategories of "sitting," "riding," "standing," "facing forward," etc. which are associated with different ways a "person" may appear in an image. Note, the labels of "sitting," "riding," etc. are examples provided for convenience, and the object detection application may generally learn an appropriate number of different subcategories. In one embodiment, the object detection application may discover subcategories using an exemplar support vector machine (SVM) based clustering approach. Other embodiments may include other clustering methods for identification of subcategories (e.g., spectral clustering, affinity propagation). Identified subcategories may further be used to initialize mixture components in mixture models which the object detection application trains in a latent SVM framework. Such training learns, for each object category, a variable (as opposed to fixed) number of subcategory classifiers. Each subcategory classifier may be applied to produce, for a given input image, a set of candidate windows (i.e., bounding boxes) associated with a subcategory label. For example, a "rider" subcategory classifier may be used to detect persons who are "riders" having a certain pose in an input image.

In addition, the object detection application may learn a structured model for object detection that captures interactions among object subcategories and identifies discriminative visual composites. As used herein, a "visual composite" includes two or more closely interacting objects. Subcategory labels detected using the subcategory classifiers discussed above, and spatial relationships between detected subcategories, may be used to reason about object interactions. For example, if a "rider" tends to appear above a "side-view bicycle," then the detection of a "side view bicycle" may increase the confidence that an object detected above the bicycle is a "person" who is a "rider." Such an increase in confidence may be accounted for by the structured model, discussed in greater detail below.

Figure 1:
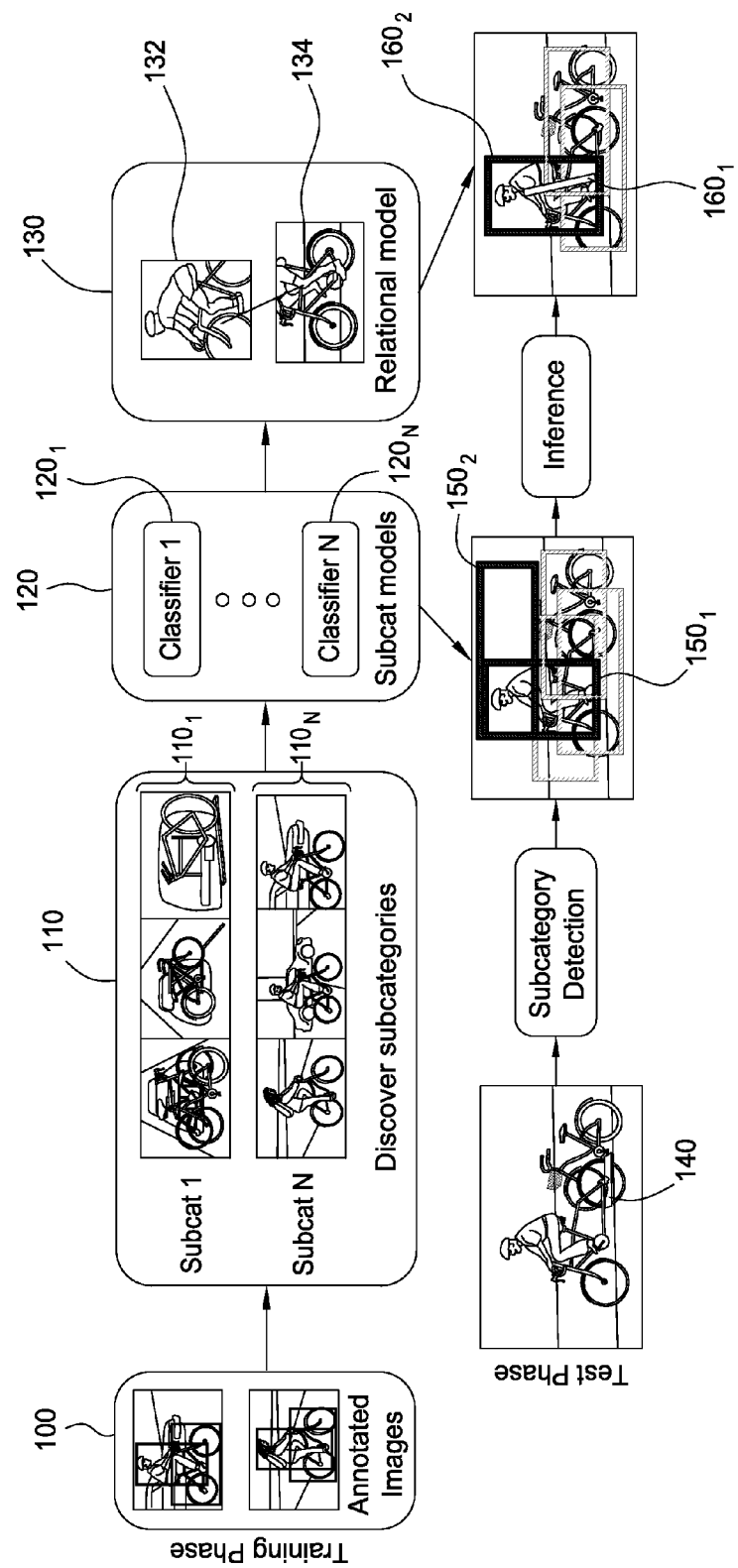
FIG. 1 illustrates a multi-level framework for training and applying models to detect objects in images, according to an embodiment.

FIG. 1 illustrates a multi-level framework for training and applying models to detect objects in images, according to an embodiment. As shown, during a training phase, an object detection application receives annotated images $100_i$ as training input. The images $100_i$ are associated with object-level annotations of objects that appear in the images $100_i$. For example, one of the images $100_i$ which depicts a person riding a bicycle may be associated with annotations including "person" and "bicycle" labels, as well as the locations (e.g., bounding boxes) of the objects as they appear in the image.

Given the annotated images $100_i$, the object detection application generates finer-grained subcategories labels for the objects. As discussed, subcategories are visual clusters that capture appearance variations of an object. For example, in images depicting bicycles, the learned subcategories for the bicycle may include "bicycle on car" $110_1$, "bicycle being ridden" $110_N$, and the like. As discussed in greater detail below, the object detection application may employ an exemplar SVM clustering approach to determine subcategory labels in one embodiment. In one embodiment, a lower bound may be set on the number of images required per subcategory cluster. Importantly, the number of subcategories is automatically determined based on the training data, rather than being a predefined value. For example, more subcategories may be identified for a "bicycle" object than a "bottle" object if "bicycles" appear in more modes (e.g., "bicycle on car," "side view bicycle," "front view bicycle," etc.) than the "bottle."

Subcategories themselves may be treated as mixture components in learning a mixture model which represents the category. In one embodiment, subcategories identified by clustering, discussed above, may be used to initialize the mixture components in the mixture model, and classifiers $120_{1-N}$ for detecting respective subcategories trained in the latent SVM framework, with training of the classifiers being coupled and the subcategory labels themselves being refined in the latent step. That is, the initial step of clustering, discussed above, estimates modes of variations within an object, and serves as initialization to a mixture model step, where the mixture model is instantiated with the modes of variation being components in mixture model that is then trained in the latent SVM framework, with the modes themselves being refined in a latent step of the framework. As an example of such refinement, the subcategory for "bicycle on car" $110_1$ may incorrectly include an image of a person riding a bicycle, and the refinement may re-associate such an image with the "bicycle being ridden" $110_N$ subcategory. Once trained, the classifiers $120_{1-N}$ may be used to detect subcategories in an input image 140 by running the learned classifiers $120_{1-N}$ independently. The output is then a set of candidate windows $150_i$, with each window being associated with a subcategory label.

Subcategory mixture models may be effective at differentiating between variations present in a given object class, but detection accuracy for some, typically smaller and less discriminative object classes may be poor. For example, a "bottle" object may be difficult to detect given that bottles often appear as two relatively parallel lines with some color between the lines, which is not very distinctive. Contextual information of relationships between detected subcategories may be used to improve the performance of object detectors. For example, it may be easier to detect a "bottle" knowing the context of where bottles tend to appear, such as on top of detected "desk" objects, and how the bottle and desk look when the bottle is on top of the desk.

In one embodiment, object-level category models may be built based on the learned subcategory classifiers so that the object-level models are attuned to contextual information, including visual and view-based correlations between subcategories of objects. For example, given subcategories of "bicycles" and "riders," the object detection application may attempt to learn, the pair-wise relationship between these subcategories, including whether they tend to occur together, as well as how far apart they tend to occur in an image. As discussed in greater detail below, such models may be trained independently for each object-level category using structured learning, such as structural SVM. In alternative embodiments, learning techniques other than structural SVM may be applied. Once trained, such models may then be used to detect objects, such as the bicycle $160_1$ and the rider $160_2$, in input images (test images) such as image 140.

Figure 2:
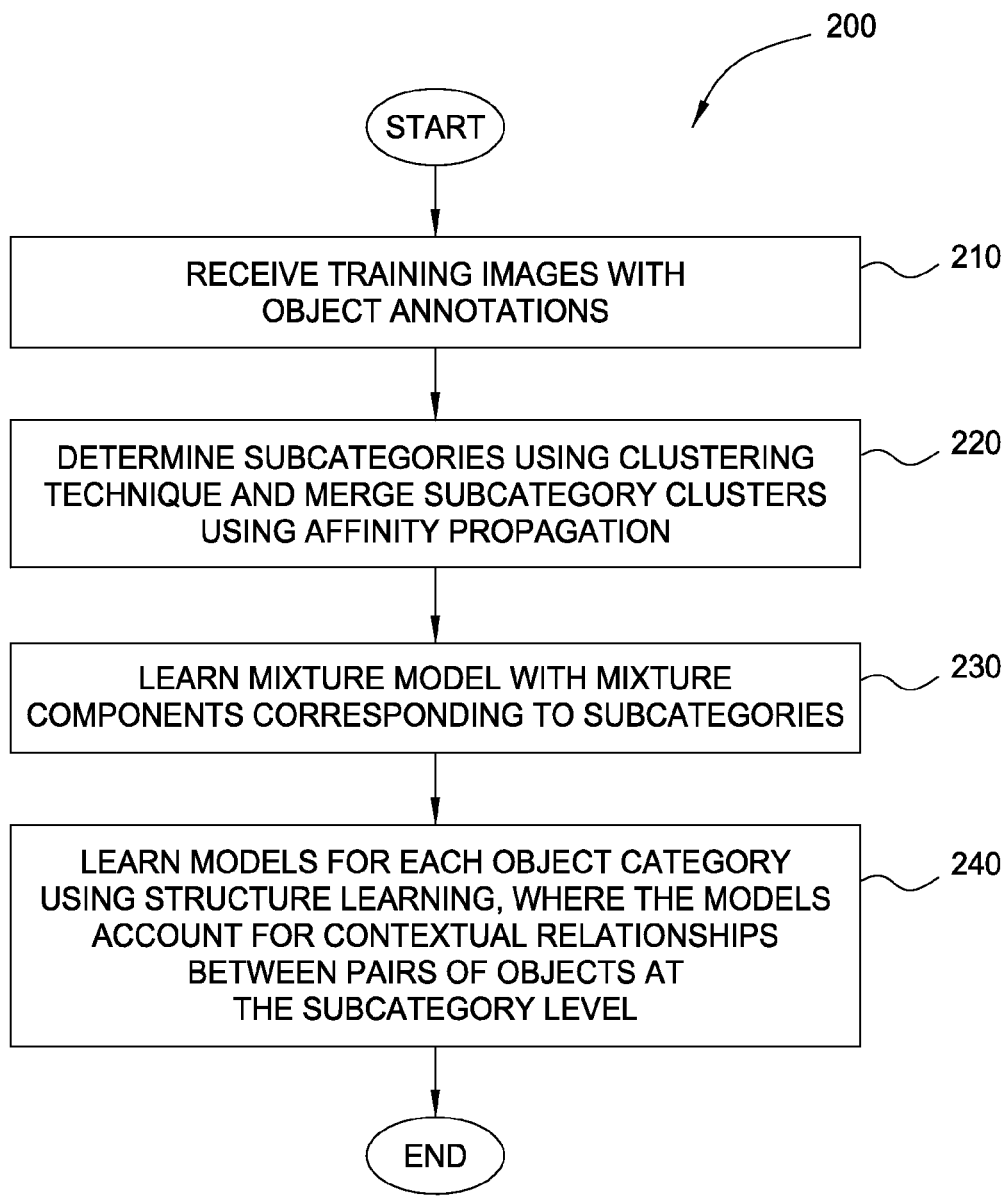
FIG. 2 illustrates a method for training mixture and object models, according to an embodiment.

FIG. 2 illustrates a method 200 for training mixture and object models, according to an embodiment. As shown, the method 200 begins at step 210, where an object detection application receives training images with object annotations. The annotations may include object category labels and bounding boxes for the objects. In one embodiment, the input may include N images accompanied by a set of $<X_n, Y_n>$ pairs, n=1, ..., N. Here, $X_n=\{x_i: i=1, ..., M_n\}$ is the representation of the n-th image, where $M_n$ is the total number of detected bounding boxes for this image, and $x_i$ is the feature vector of the i-th bounding box. $Y_n=\{y_{c,i}: c=1, ..., C, \text{ and } i=1, ..., M_n\}$ is the entire label set for image $X_n$, where C is the total number of object categories in the dataset and $y_{c,i} \in \{0, 1\}$ is a variable indicating if the i-th bounding box contains an object of the c-th category.

At step 220, the object detection application determines subcategories using a clustering technique and merges subcategory clusters using affinity propagation. Two important requirements for object subcategories are inclusivity, that subcategories should cover all or most variations in object appearance, and discriminability, that subcategories should be useful for detecting the class of object. In one embodiment, exemplar SVM is used to meet these requirements by allowing the number of subcategories per object class to be driven by appearance variations within the class itself, as opposed to a fixed global parameter as in traditional approaches. In such a case, the object detection application may train a linear (or nonlinear) SVM classifier for each exemplar which is a single positive example of the subclass, while sampling negative examples from images that do not include any instances of the example's class. In a particular embodiment, five iterations of hard negative mining may be used to train each classifier.

In one embodiment, an exemplar may be encoded by a rigid Histogram of Gradients (HOG) template, and each classifier may be interpreted as a learned exemplar-specific template. For each exemplar, the object detection application may apply the classifier associated with the exemplar on all other examples in the object class to generate respective detection scores. In one embodiment, a detection score of above −1 may be used as an indication of object instance presence, and a cluster may be formed as the exemplar itself and its top k scoring detections. Here, object instance presence refers to presence of an object of an object class which is part of some subcategory. Each subcategory may include one or more object instances and is created by finding instances that are similar (i.e., the cluster). In a particular embodiment, k may be set to 4 to keep cluster homogeneity, and clusters with fewer than a given number of members (e.g., 2 members) may be pruned. Doing so permits highly homogenous atomic clusters to be obtained.

Upon obtaining the clusters, the object detection application may merge visually consistent clusters via affinity propagation. In one embodiment, the (asymmetric) similarity from cluster s to cluster r may be defined as:

$$d_s(r) = \frac{1}{N} \sum_i \sum_j w_s(i)^T x_r(j), \quad (1)$$

where $x_r(j)$ is the HOG feature vector of the j-th example of the cluster r, the weight term $w_s(i)$ is the learned template for the i-th example of the cluster s, and N is the normalization constant computed as the number of examples in cluster r times the number of examples in cluster s. In such a case, the object detection application may compute similarities between every pair of clusters and apply affinity propagation to gradually merge the clusters into large clusters by, e.g., a message-passing procedure. Further, the object detection application may run affinity propagation separately for each object-level category to obtain subcategories for that category. Advantageously, affinity propagation does not require parameters that specify a desired number of clusters, as the number of clusters is determined from the data itself.

At step 230, the object detection application learns a mixture model which represents the category with mixture components corresponding to the identified subcategories. Given the subcategories identified at step 220, the object detection application may learn a mixture model based on a discriminatively trained part based models (DPM). In general, DPM is trained from a set of labeled examples D=($\langle x_1, y_1 \rangle, \ldots, \langle (x_n, y_n) \rangle$), where $y_i \in \{-1,1\}$, and the goal is to learn model parameters w by minimizing the objective function $$L_D(w) = \frac{1}{2}\|w\|^2 + C \sum_{i=1}^{n} \max(0, 1 - y_i f_w(x_i)) \quad (2)$$

where $f_w(x_i)$ is the score of the classifier w on example $x_i$. Here, $f_w(x_i)$ may be written as $f_w(x) = \max_{z \in Z(x)} w^T \Phi(x, z)$, where z are the latent variables and Z(x) are the set of possible latent values for an example x. Since the optimization is non-convex, the model parameters w and the latent variables z may be learned using an iterative approach.

In one embodiment, the object detection application may train subcategory classifiers in the latent SVM framework, where the training of the classifiers are coupled and the subcategory labels, which correspond to the mixture components in DPM, are refined in the latent step. Doing so avoids potential problems in calibrating scores output by individual SVM classifiers obtained by training DPM for each subcategory independently, and also cleans up the subcategories identified at step 220, which may be noisy where, e.g., one subcategory includes an image depicting an object instance that belongs in another subcategory.

In traditional DPM, mixture components are initialized according to the examples' aspect ratios and updated in the latent step. However, the aspect ratio heuristic does not generalize well to a large number of subcategories and often does not provide a good initialization for learning. One embodiment may instead use the subcategories identified at step 220 as the initialization of the mixture components.

After the mixture components are initialized and the subcategory classifiers trained in the latent SVM framework, the object detection application may detect objects in other images by running the learned classifiers independently for each mixture component (i.e., each subcategory). The output is then a set of candidate windows associated with subcategory labels.

At step 240, the object detection application learns models for each object category using structure learning, where the models account for contextual relationships between pairs of objects at the subcategory level. In such learning, the object detection application may use a model to make object detections (i.e., makes "inferences") in one or more training image, and then compare the detections with ground truth provided by the object annotations for the training images. Given this comparison, the object detection application may reason about what mistakes the model made and adjust the model to attempt to make more optimal inferences.

In one embodiment, models may be learned separately for each object-level category. For the c-th object-level category, the model may score bounding box i as follows:

$$S_c(x_i, y_{c,i}, h_i) = \alpha_{p_i}^T x_i \cdot y_{c,i} + \Sigma_{j \in L_i} \beta_{p_j}^T d_{ij} \cdot h_{ij} + \Sigma_{j \in L_i} \gamma_{p_i, p_j}^T x_j \cdot h_{ij}, \quad (3)$$

where $\alpha_{p_i}^T x_i \cdot y_{c,i}$ is a root model representing the confidence that the object belongs to an object-level category given subcategory detector output (e.g., the confidence that an "object" is a bicycle given the subcategory detector output), $\beta_{p_j}^T d_{ij} \cdot h_{ij}$ is a context model representing the confidence that the object belongs to the object-level category given the positions of other subcategories in the image (e.g., the confidence that an object is a "bicycle" given the position of the object relative to a "rider" subcategory label detected in the image), and $\gamma_{p_i, p_j}^T x_j \cdot h_{ij}$ is a co-occurrence model representing the confidence that the object belongs to the object-level category given the co-occurrence of two objects (e.g., the confidence that an object is a bicycle given the co-occurrence of a the object with a "rider"). Models other than the root model, context model, and co-occurrence model may be included in other embodiments, such as a model of weaker spatial relationships which considers whether a detected subcategory is to the left or right, or above or below, another detected subcategory.

The root model $\alpha_{p_i}^T x_i \cdot y_{c,i}$ uses the output of the subcategory detector as the single feature. To learn biases between different subcategories, a constant 1 may be appended to make $x_i$ two-dimensional. $\alpha_{p_i}$ is the two-dimensional weight that corresponds to the subcategory class of the i-th bounding box, and $p_i \in \{1, \ldots, K\}$ is an indicator variable showing the subcategory detector that selected the i-th bounding box, where K is the total number of subcategories in the dataset. If the bounding box is labeled as background ($y_{c,i}=0$), then the potential of the root model is set to zero.

In the context model $\beta_{p_j}^T d_{ij} \cdot h_{ij}$, the term $d_{ij} = [x_j, g_{ij}]$ represents the objects in context, where $x_j$ is the detection score of the j-th bounding box and $g_{ij}$ is the spatial feature computed based on the relative position and scale of the j-th bounding box with respect to the i-th bounding box using a Gaussian distributed, discussed in greater detail below. $h_{ij}$ is a binary latent variable that determines whether the contextual object is discriminative and should be included in the context model. For example, some subcategory pairs (e.g., "bottle" and "bicycle") may not appear together in training images, and the binary latent variables may be used to prune such subcategory pairs which are not meaningful from being considered. In one embodiment, weighting of which subcategory pairs are important is learned in structure learning, and a superset of all relationships is learned, with some subset of subcategory pairs being turned on during inference using the appropriate binary latent variables.

In one embodiment, a star model may be used to represent a visual composite, with the detected object being connected to other objects in the vicinity of the detected object. In such a case, an object hypothesis may be represented by a star graph which specifies an object bounding box and a set of bounding boxes of contextual objects. Assuming the central object's index is i, $L_i$ will be used herein to denote the indices of contextual objects in an image where $L_i=\{j:j\in \{1, \ldots, M_n\}\setminus i\}$. Intuitively, this star model is similar to the known part based model, and the objects in context are treated as parts. However, instead of treating all objects in the image as context, the object detection application may use binary latent variables $h_{ij}$ to discriminatively select which objects have strong interactions with the central object and should be included in the model, as discussed above. Other objects that are not selected are not included in the model. The star graph that includes the central object and selected contextual objects represents a visual composite. The goal of learning is then to obtain a rich set of visual composites that are not only highly characteristic of the object class, but also highly discriminative compared to other classes.

In training, a set of discriminative visual composites may be determined automatically, with each visual composite including two or more objects. Objects that belong to the same composite should co-occur frequently and conform to spatial and scale relationships that are consistent across images (e.g., that a rider appears at a certain position above a bicycle relatively frequently). Consider a visual composite, represented by a star graph. One key insight is that based on the definitions above, contextual objects windows (leaves of the star graph) should have consistent layout with the central object window. In other words, contextual objects should be able to consistently predict a bounding box for the central object under consideration.

In one embodiment, the object detection application may fit a three-component Gaussian mixture model to pairs of bounding boxes of objects that co-occur in training images. The three component Gaussian mixture model allows the modeling of various spatial and scale aspects of object-to-object relationships. In other embodiments, any number of components within a Gaussian mixture can be used. Notably, it is easy to produce a hypothesis for a bounding box of a central object by conditioning the learned mixture model on the bounding box of a contextual object. Given an image, the object detection application uses the Gaussian mixture model to determine a set of possible contextual objects for each central object window. In one embodiment, the object detection application may consider contextual objects to be objects in windows that, given a learned spatial Gaussian mixture model, can predict a given central object window to greater than a threshold of overlap, e.g., >0.3 overlap.

To train the Gaussian mixture model, the object detection application may iterative over all true positive activations, i.e., responses of the detector that are within some threshold (e.g. 0.5) overlap to the input object annotation. In this way, the object detection application may obtain the visual composites that have tight spatial configuration coupling.

Once trained, the object detection application may apply the Gaussian mixture model to determine visual composites in input images. Note, if the object detection application naively includes all spatially consistent detection windows as contextual objects for a given candidate central object, then performance may be hurt by the inclusion of many false positives. In one embodiment, binary latent variables associated with respective candidate contextual windows may be used to discriminatively select if a given candidate contextual windows will be included in a composite object model, as discussed above. As used herein, $h_i$ denotes, for an object window i, the binary latent variables for all contextual objects with indices in the set $L_i$, discussed above. The binary latent variables may be known during learning and inferred during testing.

The co-occurrence model $\gamma_{p_i,p_j}^T x_j \cdot h_{ij}$ captures the "prior" over the subcategory combinations. The intuition is that certain pairs of subcategories tend to co-occur while others do not, for example, a bicycle with side view tends to co-occur with a rider with the same viewpoint, and a horse tends to co-occur with a horse rider instead of a person walking.

Given the model of equation (3), an inference procedure may be used to return object labels and visual composites which indicate the closely related contextual objects for each object window. In one embodiment, the inference may include solving the following optimization problem:

$$(\hat{y}_{c,i}, \hat{h}_i) = \arg \max_{y_{c,i}, h_i^n} S_c(x_i, y_{c,i}, h_i). \tag{4}$$

For the bounding box i, the inference is on a star graph, and the object detection application may jointly infer the presence or absence of the c-th category $y_{c,i}$ as well as the corresponding binary latent variables $h_i$ of the contextual objects. This is a very simple exact inference, as $y_{c,i}$ and $h_i$ are binary variables and the object detector application can enumerate all possible values of the random variable to find the optimal solution. Note, $h_i$ may be constrained to an all-zero vector when $y_{c,i}=0$, which means object interactions with background are not considered.

Given N training images with an annotated set of bounding boxes X and corresponding object category indicator labels Y, the object detector application trains the model parameter $\theta$ so that the model of equation (3) tends to produce correct object labels. In one embodiment, the object detector may train models independently for each object-level category. In such a case, the object detector application may use the following objective function to learn the model parameter $\theta_c$ for the c-th category:

$$\min_{\theta_c, \xi \geq 0} \frac{1}{2}\|\theta_c\|^2 + C\sum_{n=1}^{N}\sum_{i=1}^{M_n} \xi_i^n \tag{5}$$

$$S_c(x_i^n, y_{c,i}^n, h_i^n) - S_c(x_i^n, \hat{y}_{c,i}^n, \hat{h}_i^n) \geq \Delta(y_{c,i}^n, \hat{y}_{c,i}^n) - \xi_i^n, \forall i, \forall n,$$

where the loss function $\Delta$ is a 0-1 loss that measures the difference between the ground-truth object category indication $y_{c,i}^n$ and the variable $\hat{y}_{c,i}^n$ obtained through the inference procedure discussed above. Here, $\Delta(y_{c,i}^n, \hat{y}_{c,i}^n)=1$ if $y_{c,i}^n \approx \hat{y}_{c,i}^n$ and 0 otherwise. This form of learning problem is knows as structural SVM, and well-known solvers such as the bundle optimization solver may be used to solve this problem. Note, during training, the contextual binary variables $h_i$ are observable based on the ground truth visual composites. Experience has shown that letting $h_i$ be latent during learning may result in inferior performance which may be attributable to resulting non-convexity in the objective.

Figure 3:
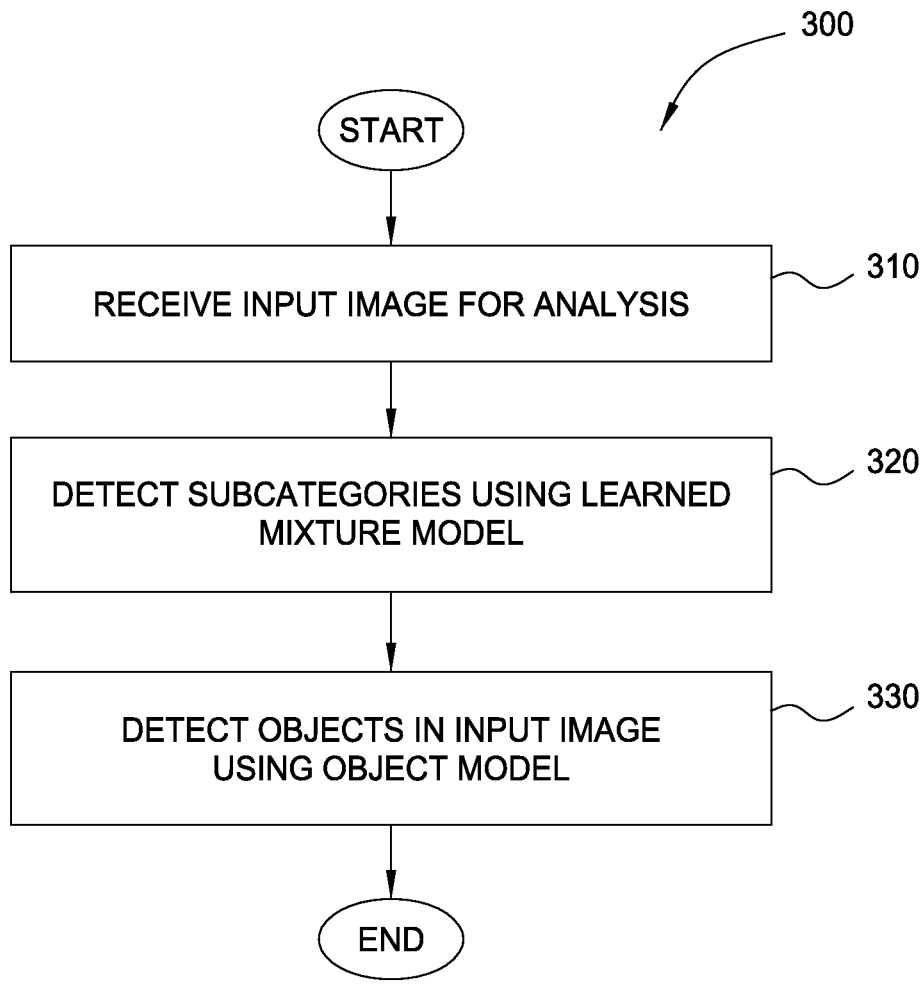
FIG. 3 illustrates a method for detecting objects in images using trained mixture and object models, according to an embodiment.

FIG. 3 illustrates a method 300 for detecting objects in images using trained mixture and object models, according to an embodiment. As shown, the method 300 begins at step 310, where the object detection application receives an input image for analysis. At step 320, the object detection application detects subcategories using the learned subcategory classifiers. In one embodiment, the object detection application may independently run the classifiers for each subcategory which are learned according to step 230 of the method 200, discussed above. As discussed, each such classifier may output a set of candidate windows with each window being associated with a subcategory label.

At step 340, the object detection application detects objects in the input image using object-category models, given the output of the subcategory classifiers. In one embodiment, the learned object-category models may be used to re-score the candidate windows detected at step 320 based on object compositional relationships to generate the final detection result. For example, a window labeled a "rider" may be re-scored, based on the context of the "rider" on top of a "bicycle," to indicate increased confidence that the "rider" is in fact a "person" object.

As discussed, models may be trained separately for each object-level category. Each object-category model may then be used to detect objects in the associated category by applying the inference technique discussed above with respect to equation (4). For example, the object detection may run a "person" detector to detect person objects and a "bicycle" detector to detect a bicycle objects. As discussed, binary latent variables may be used to discriminatively select which pairs of subcategories should be considered in the model. The output of such detection with the model may include both object labels and visual composites that tell the closely related contextual objects for each windows.

In another embodiment, the object detection application may take as input a query, and use a heuristic to combine separate object-category model scores for output. For example, the query may be a visual phrase query, such as "person riding bicycle." In such a case, the object detection application may apply both the "person" detector and the "bicycle detector" on the input image, and output a score which is the sum of the maximum person detector score and the maximum bicycle detector score on the image. Here, detector scores across object categories may be normalized to the same scale by logistic regression.

Figure 4:
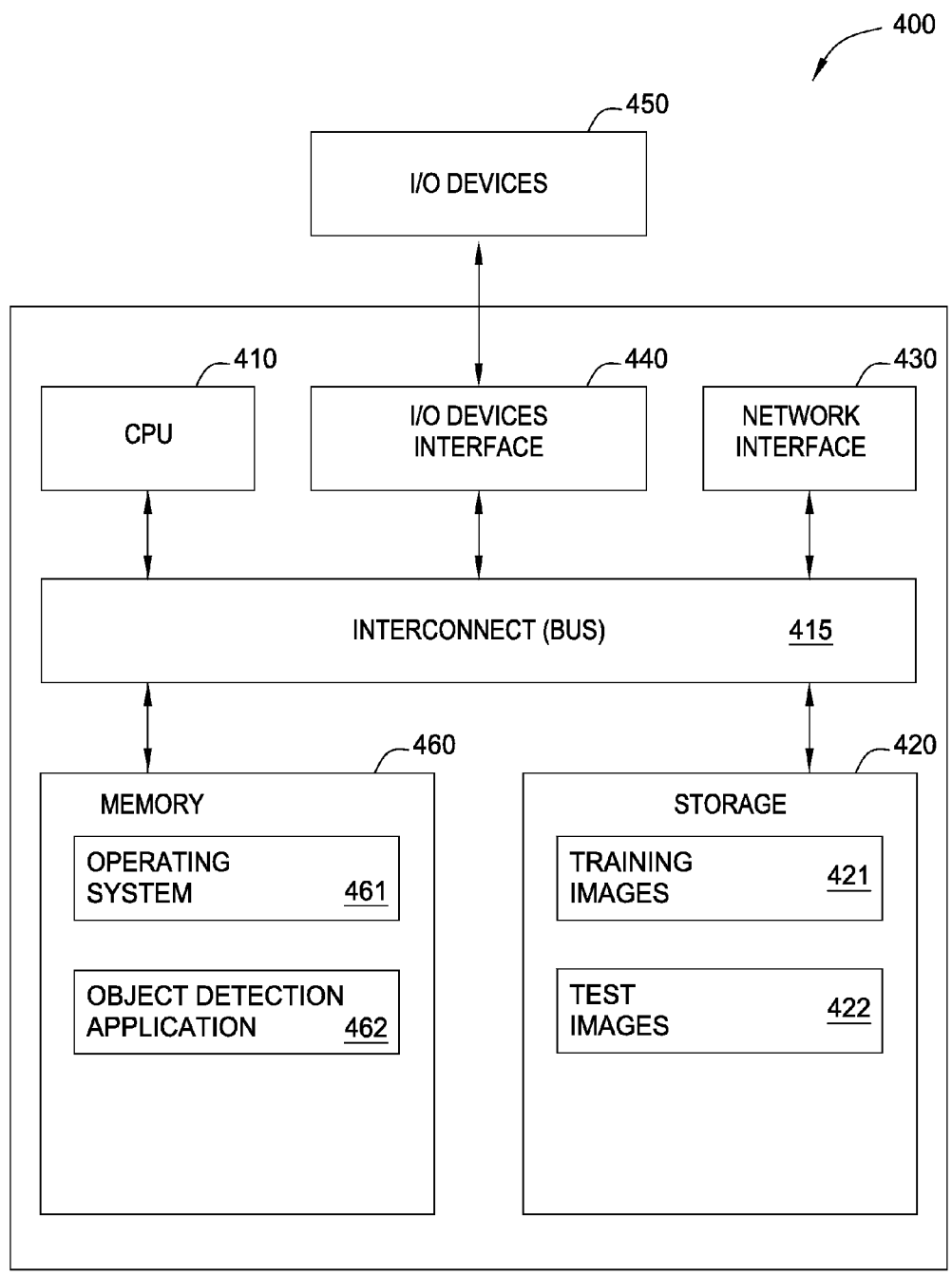
FIG. 4 illustrates a system in which aspects of the invention may be implemented.

FIG. 4 illustrates a system 400 in which an embodiment may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as magnetic disk drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and an object detection application 462. Illustratively, the operating system 461 may include Microsoft's Windows®. Given a set of training images with object annotations, the object detection application 462 is configured to learn models for generating semantic labeling for object detections, where the semantic labeling include both lower-level subcategories and higher-level visual composites, as well as to apply the learned models to detect objects in images. In one embodiment, the object detection application 462 may be configured to learn subcategory labels using a discriminative clustering technique, learn subcategory classifiers in a latent SVM framework, and learn object-level models for each category of objects using a structure learning technique, according to the method 200 discussed above. The object detection application 462 may further be configured to apply the learned subcategory detector models to detect subcategory labels in an input image and detect objects in the input image using the learned object-category models, according to the method 300 discussed above. In alternative embodiments, the functions of learning the models and applying the models may be split between one or more different applications, as opposed to being performed by the object detection application 462 alone.

Advantageously, techniques disclosed herein permit objects to be detected in images with relatively high average precision. Consistent subcategories are trained via a clustering technique and used to train subcategory classifiers that are discriminative and address intra-class variations among basic level categories. Further, techniques disclosed herein model visual composites which improves performance for some typically hard-to-detect object categories such as "bottle" and "chair." Multi-level (contextual) semantic labeling help resolve intra-class variations within object-level categories. The visual composites may also prune some false positives object detections that violate typical spatial configuration. For example, a false-positive detection of a "bottle" object may be identified based on its location below a "table."

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A computer-implemented method for detecting objects in an input image, comprising:
   receiving a set of training images and associated annotations, the annotations labeling categories and locations of objects which appear in the images;
   determining one or more subcategories for each of the categories of objects, wherein the number of subcategories for an object category is inferred from the training images and the associated annotations via a clustering technique in which the number of subcategories is driven by appearance variations within the object category, and wherein the clustering technique does not require the number of subcategories for the object category to be specified as an input to the clustering technique;
   training classifiers for detecting the subcategories;
   training a respective structured model for each of the categories of objects, the respective structured model accounting for relationships between detected subcategories; and
   detecting the objects in the input image using the trained subcategory classifiers and structured models.

2. The method of claim 1, wherein the training of the classifiers is coupled.

3. The computer-implemented method of claim 1, wherein the determining one or more subcategories includes:
   for one or more exemplars, each representing a positive example of a respective subcategory, training a support vector machine (SVM) to obtain a respective cluster including the exemplar;
   determining similarities between each pair of clusters; and
   merging clusters using affinity propagation based on the similarities between the pairs of clusters.

4. The computer-implemented method of claim 1, wherein the classifiers for detecting the subcategories are trained in a latent SVM framework, and wherein the subcategories are refined during a latent step of the latent SVM framework.

5. The computer-implemented method of claim 4, wherein each subcategory is a mixture component of a mixture model which is trained.

6. The computer-implemented method of claim 1, wherein the structured model for one of the categories of objects includes one or more of a root model representing a confidence that a given object belongs to the one of the categories based on output of a subcategory classifier, a spatial context model representing a confidence that a given object belongs to the object-level category based on spatial positions of other subcategories detected in the image, a weak spatial contextual model that encodes whether objects are above/below or to the left/right of other objects, and a co-occurrence model representing a confidence that the given object belongs to the object-level category based on the co-occurrence of two subcategories.

7. The computer-implemented method of claim 6, wherein the structured model includes binary latent variables used to select if a given contextual object is included in the structured model.

8. The computer-implemented method of claim 1, wherein, in the structured model, a star model connects a central object to one or more contextual objects.

9. The computer-implemented method of claim 1, further comprising:
   receiving a query which identifies one or more object categories; and
   generating a heuristic score which is a combination of scores produced by the structured models for the one or more object categories.

10. A non-transitory computer-readable storage medium storing a program, which, when executed by a processor performs operations for detecting objects in an input image, the operations comprising:
   receiving a set of training images and associated annotations, the annotations labeling categories and locations of objects which appear in the images;
   determining one or more subcategories for each of the categories of objects, wherein the number of subcategories for an object category is inferred from the training images and the associated annotations via a clustering technique in which the number of subcategories is driven by appearance variations within the object category, and wherein the clustering technique does not require the number of subcategories for the object category to be specified as an input to the clustering technique;

training classifiers for detecting the subcategories;

training a respective structured model for each of the categories of objects, the respective structured model accounting for relationships between detected subcategories; and detecting the objects in the input image using the trained subcategory classifiers and structured models.

11. The non-transitory computer-readable storage medium of claim 10, wherein the training of the classifiers is coupled.

12. The non-transitory computer-readable storage medium of claim 11, wherein the determining one or more subcategories includes:

for one or more exemplars, each representing a positive example of a respective subcategory, training a support vector machine (SVM) to obtain a respective cluster including the exemplar;

determining similarities between each pair of clusters; and merging clusters using affinity propagation based on the similarities between the pairs of clusters.

13. The non-transitory computer-readable storage medium of claim 10, wherein the classifiers for detecting the subcategories are trained in a latent SVM framework, and wherein the subcategories are refined during a latent step of the latent SVM framework.

14. The non-transitory computer-readable storage medium of claim 13, wherein each subcategory is a mixture component of a mixture model which is trained.

15. The non-transitory computer-readable storage medium of claim 10, wherein the structured model for one of the categories of objects includes one or more of a root model representing a confidence that a given object belongs to the one of the categories based on output of a subcategory classifier, a spatial context model representing a confidence that a given object belongs to the object-level category based on spatial positions of other subcategories detected in the image, a weak spatial contextual model that encodes whether objects are above/below or to the left/right of other objects, and a co-occurrence model representing a confidence that the given object belongs to the object-level category based on the co-occurrence of two subcategories.

16. The non-transitory computer-readable storage medium of claim 15, wherein the structured model includes binary latent variables used to select if a given contextual object is included in the structured model.

17. The non-transitory computer-readable storage medium of claim 10, wherein, in the structured model, a star model connects a central object to one or more contextual objects.

18. The non-transitory computer-readable storage medium of claim 10, the operations further comprising:

receiving a query which identifies one or more object categories; and generating a heuristic score which is a combination of scores produced by the structured models for the one or more object categories.

19. A system, comprising:

a processor; and a memory, wherein the memory includes an application program configured to perform operations for detecting objects in an input image, the operations comprising:

receiving a set of training images and associated annotations, the annotations labeling categories and locations of objects which appear in the images, determining one or more subcategories for each of the categories of objects, wherein the number of subcategories for an object category is inferred from the training images and the associated annotations via a clustering technique in which the number of subcategories is driven by appearance variations within the object category, and wherein the clustering technique does not require the number of subcategories for the object category to be specified as an input to the clustering technique, training classifiers for detecting the subcategories, training a respective structured model for each of the categories of objects, the respective structured model accounting for relationships between detected subcategories, and detecting the objects in the input image using the trained subcategory classifiers and structured models.

20. The system of claim 19, wherein the training of the classifiers is coupled, and wherein the one or more subcategories are determined by:

for one or more exemplars, each representing a positive example of a respective subcategory, training a support vector machine (SVM) to obtain a respective cluster including the exemplar;

determining similarities between each pair of clusters; and merging clusters using affinity propagation based on the similarities between the pairs of clusters.

* * * * *

UNITED STATES PATENT AND TRADEMARK OFFICE
CERTIFICATE OF CORRECTION

PATENT NO. : 9,477,908 B2
APPLICATION NO. : 14/250284
DATED : October 25, 2016
INVENTOR(S) : Leonid Sigal et al.

Page 1 of 1

It is certified that error appears in the above-identified patent and that said Letters Patent is hereby corrected as shown below:

In the Specification

In Column 8, Line 49, delete "$y_{c,i}^n \approx \hat{y}_{c,i}^n$" and insert -- $y_{c,i}^n \neq \hat{y}_{c,i}^n$ --, therefor.

Signed and Sealed this
Twenty-first Day of March, 2017

Michelle K. Lee
*Director of the United States Patent and Trademark Office*